United States Patent [19]
Pinch et al.

[11] 3,985,919
[45] Oct. 12, 1976

[54] VAPOR DEPOSITION OF CERMET LAYERS
[75] Inventors: Harry Louis Pinch, Princeton; Stephen Thomas Opresko, Hightstown, both of N.J.
[73] Assignee: RCA Corporation, New York, N.Y.
[22] Filed: Apr. 30, 1975
[21] Appl. No.: 573,389

[52] U.S. Cl. .............................. 427/101; 427/229; 427/252; 427/377; 427/248 E; 148/6.3
[51] Int. Cl.² .................. C23C 17/02; C23C 11/00
[58] Field of Search .......... 427/101, 229, 248, 251, 427/252, 350, 377, 111; 29/260; 148/6.3

[56] References Cited
UNITED STATES PATENTS

| | | | |
|---|---|---|---|
| 3,051,592 | 8/1962 | Woerner | 427/229 |
| 3,189,476 | 6/1965 | Cowan | 427/229 |
| 3,215,555 | 11/1965 | Krey | 427/229 |
| 3,514,324 | 5/1970 | Koppius | 427/229 |
| 3,537,888 | 11/1970 | Schwyn | 427/377 |

FOREIGN PATENTS OR APPLICATIONS

| | | | |
|---|---|---|---|
| 650,173 | 2/1951 | United Kingdom | 427/377 |

Primary Examiner—Dennis E. Talbert, Jr.
Assistant Examiner—Charles R. Wolfe, Jr.
Attorney, Agent, or Firm—Glenn H. Bruestle; Carl L. Silverman

[57] ABSTRACT

A metal oxide vapor, such as tungsten oxide, is reacted with a ceramic material, such as aluminum oxide, at a temperature in the range of from about 1300°C to about 1400°C. The metal oxide vapors diffuse into the ceramic material during the reaction. The ceramic material, which now includes tungsten oxide diffused therein, is then subjected to a reducing atmosphere so as to form a cermet region in the ceramic material.

12 Claims, 3 Drawing Figures

VAPOR DEPOSITION OF CERMET LAYERS

BACKGROUND OF THE INVENTION

The present invention relates to a method of forming cermet layers, and particularly, to such a method wherein cermet resistors having low temperature coefficients of resistance, high sheet resistance and good thermal stability can be prepared.

Cermet layers or films have found extensive use as resistors in microelectronic devices, integrated semiconductor circuits and in hybrid thick film circuits. Conventional methods of forming the cermet layers include co-evaporating or co-sputtering metals and ceramics, painting or silk screening mixtures of metals and ceramic particles onto suitable substrate surfaces, and by chemical vapor deposition of a cermet layer in a reactive oxiding atmosphere.

Hybrid circuits usually include conventional semiconductor chips containing transistors and diodes. The chips are mounted on an insulating substrate which also contains passive components such as resistors, capacitors and inductors in any one of several different forms. For example, the passive components may be conventional, discrete, miniature-sized units mounted separately on the substrate and connected together with printed wiring or soldered wires. Or, more desirably, the passive circuit components may be a deposited film.

For many applications, it is desirable to obtain a film having a high sheet resistance and a low temperature coefficient of resistivity (TCR). For example, U.S. Pat. No. 3,669,737 issued June 13, 1972, discloses a thin film electrical resistance element having a sheet resistance of from about 50 ohms/square to 5000 ohms/square. The electrical resistance element of the previously mentioned U.S. patent is a layer consisting of a mixture of tungsten and tungsten oxide deposited by the pyrolytic decomposition of tungsten hexacarbonyl. By the addition of varying amounts of oxygen, the sheet resistance of the deposited film can be selected within the previously mentioned range. It would therefore be desirable to develop a cermet layer or region having a relatively high sheet resistance, i.e., greater than 5000 ohms/square, and a low temperature coefficient of resistivity.

SUMMARY OF THE INVENTION

A method of forming a cermet region in an insulating substrate in which a metal oxide vapor is reacted with the substrate. The metal oxide vapor is of a material capable of diffusing into the substrate. The reacted substrate is then exposed to a reducing atmosphere so as to reduce at least some of said metal oxide which diffused into said substrate.

DETAILED DESCRIPTION OF THE INVENTION

In the method of the present invention, a volatile metal oxide, i.e., one which has an appreciable vapor pressure at the temperature of reaction, and which can be reduced to the metal, is reacted at elevated temperatures with an insulating substrate, e.g., a ceramic or glass-ceramic substrate. For example, tungsten oxide or molybdenum oxide can be reacted with aluminum oxide at temperatures between 1300° and 1400° C. The reacted substrate is then exposed to a reducing agent, e.g., hydrogen or carbon monoxide gas, to yield a substrate having a cermet layer therein.

Figure 1:
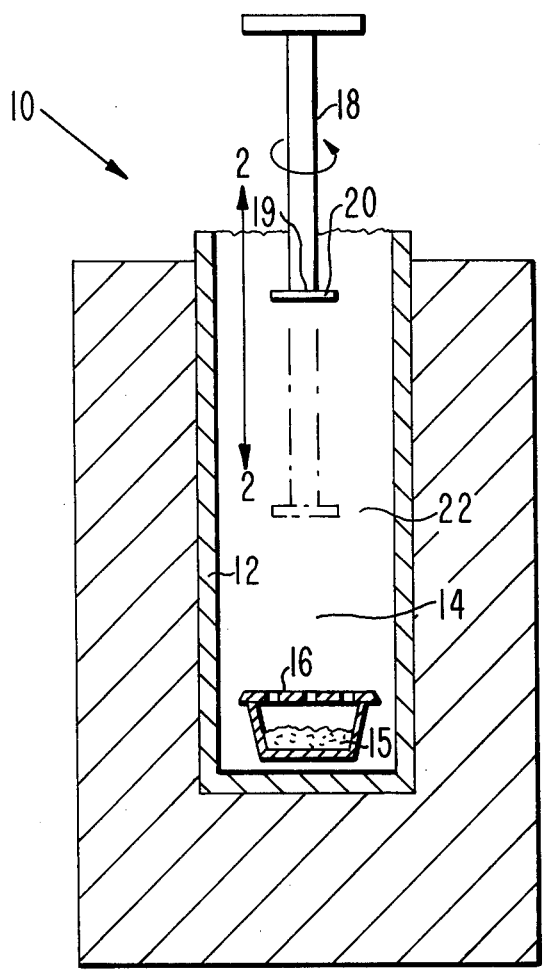
FIG. 1 is a cross-sectional view of a reaction chamber useful in the method of the present invention.

Referring initially to FIG. 1, a reaction chamber suitable for use in the method of the present invention is generally designated as 10. The reaction chamber 10 is a gradient furnace of the kind that is well-known in the art. The reaction chamber 10 includes a thin walled liner 12 which is preferably of a material, e.g., platinum, capable of maintaining the desired purity of materials. Within the area enclosed by the liner 12 is a volatilization zone 14 for volatilizing, i.e., vaporizing, a desired metal oxide 15. The desired metal oxide 15 can be contained in a perforated covered crucible 16 which may also be of a material such as platinum. The reaction chamber 10 includes a rotating holder 18. The rotating holder 18 includes an end portion 19 for holding a ceramic substrate 20. The rotating holder 18 also functions to move the desired ceramic substrate 20 into and out of the reaction zone 22, i.e., in the direction shown by line 2—2 in the Drawing.

To carry out the method of the present invention, the volatile metal oxide 15, e.g., tungsten oxide, is placed in the crucible 16 of the reaction chamber 10. The volatilization zone 14 is then heated, as is well known in the art, until the tungsten oxide converts into tungsten oxide vapor. Typically, the volatilization of tungsten oxide occurs within the temperature range of from about 1300° C to about 1400° C. Within this range, the vapor pressure of the tungsten oxide varies from about 1 mm to about 8.5 mm of mercury. The ceramic or glass-ceramic substrate 20, e.g., aluminum oxide, such as the high density, high purity aluminum oxide which is commercially available from American Lava Corporation under the designation Alsimag 772, is mounted on the end portion 19 of the holder 18. The rotating holder 18 is then utilized to move the substrate 20 into the reaction zone 22, as shown by the dashed lines in FIG. 1, where it comes into contact with the tungsten oxide vapor previously formed. As a result, the tungsten oxide vapor reacts with the aluminum oxide substrate 20 to form an aluminum oxide substrate 20 having a region therein which includes tungsten oxide molecules. It is believed that this reaction is due to the diffusion of the tungsten oxide molecules into the aluminum oxide substrate 20. Thus, it is essential that the volatile metal oxide employed be capable of diffusing into the substrate with which it is reacted. The substrate 20 is maintained in the reaction zone 22 for specified time periods, typically in excess of 2 minutes, and then removed. If the substrate 20 is maintained in the reaction zone 22 for too long a time period, which depends on the particular conditions, the metal oxide may undesirably deposit on the substrate 20 instead of diffusing into the substrate 20.

Preferably, the tungsten oxide vapor and the aluminum oxide substrate 20 are brought into contact with each other at a temperature of about 1380° C. It is preferable to rotate the holder 18 while the reaction is occurring as the resultant rotation of the substrate 20 results in a more uniform reaction between the tungsten oxide vapor and the surface of the aluminum oxide substrate 20.

The reacted substrate 20 is then transferred to a standard reduction chamber (not shown) where the metal oxide vapor which diffused into and reacted with the substrate 20 is then reduced so as to form the desired cermet region in the substrate 20. For example, when tungsten oxide vapor is reacted with an aluminum oxide substrate 20, the tungsten oxide that diffuses into and reacts with the aluminum oxide substrate is reduced to metallic tungsten so as to form a cermet region of tungsten and aluminum oxide in the aluminum oxide substrate 20. The reacted substrate 20 can be subjected to a reducing atmosphere so as to reduce at least some of the metal oxide which diffused into the substrate 20. If standard reducing agents, such as hydrogen gas or carbon monoxide gas, are utilized, reduction temperatures in the range of from about 600° C to about 1200° C produce satisfactory results. It is now apparent that if the metal oxide has been deposited on the substrate rather than diffused into the substrate, as previously stated, subjecting the reacted substrate to a reducing atmosphere would result in a continuous film of tungsten having an intrinsic low resistance.

In the method of the present invention, it has been found that the sheet resistance of the cermet region is determined by several parameters. One such parameter is the vapor pressure of the metal oxide vapor, which is controlled by the temperature of the volatilization zone. Another parameter is the temperature of the reaction zone, which controls the rate of the reaction, i.e., the diffusion of the metal oxide vapor into the substrate. Another parameter is the time of exposure of the substrate in the reaction zone. The reduction temperature and time are also parameters of interest. Finally, the nature of the material of the substrate 20 e.g., its purity, grain size, chemical composition, etc., the nature of the volatile metal oxide, and the relation therebetween are also important parameters.

Figure 2:
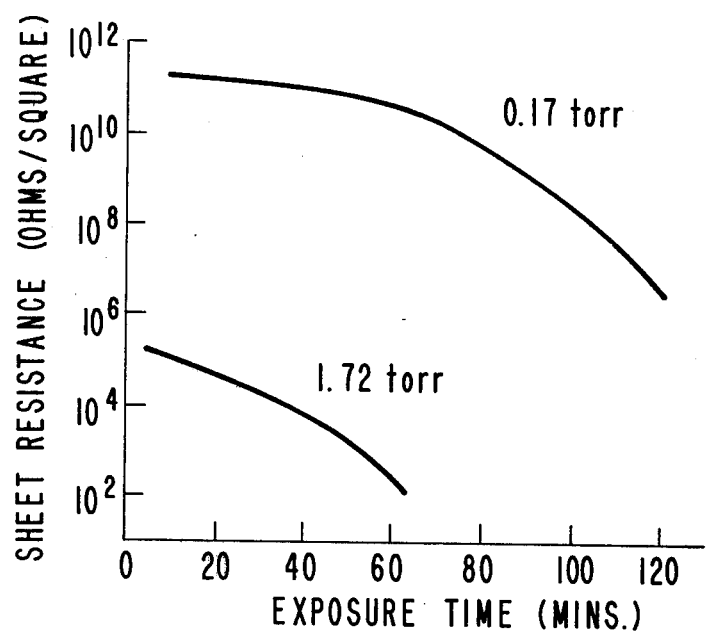
FIGS. 2 and 3 are graphs showing the sheet resistance of a cermet region formed in accordance with the method of the present invention as a function of several different parameters.
Figure 3:
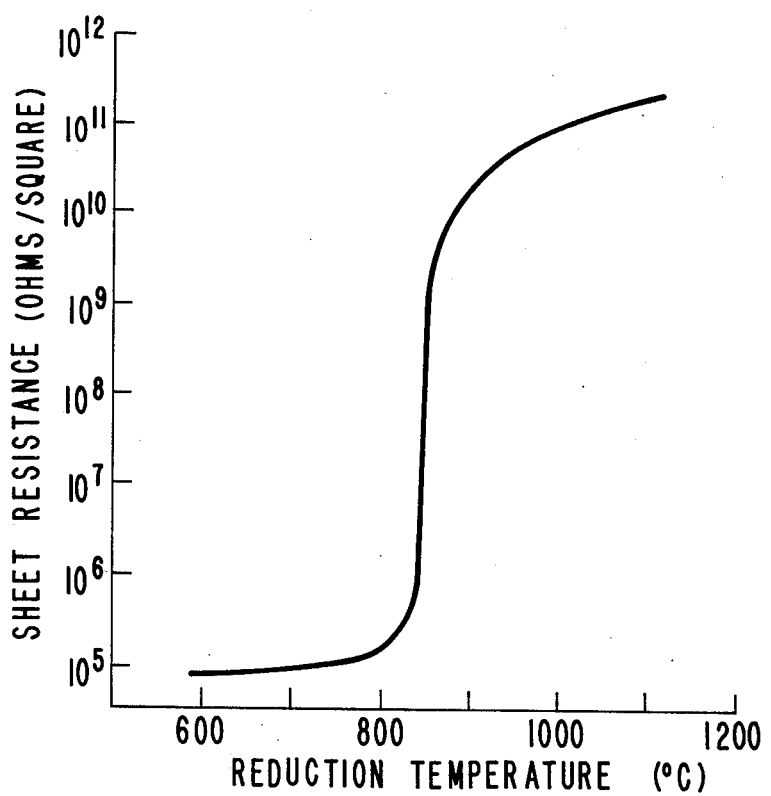

The effects of varying several of the preparation parameters are shown in FIGS. 2 and 3. FIG. 2 shows the sheet resistance of the cermet region as a function of the time of exposure in the reaction zone for two different metal oxide vapor pressures. The data shown in FIG. 2 was obtained with a tungsten-aluminum oxide formed at a reaction temperature of 1380° C and reduced at 600° C for eight hours. As can be observed from FIG. 2, higher metal oxide vapor pressure and longer exposure time result in lower values of cermet resistance. The data shown in FIG. 3 were obtained with a tungsten-aluminum oxide cermet which was reacted under a metal oxide vapor pressure of 1.72 torr and exposed for 10 minutes to a reaction temperature of 1380° C. As can be observed from FIG. 3, the effects of reduction temperature on sheet resistance are minimal in the range of from about 600° to 750° C. Above this range, the resistance gradually increases and then abruptly rises about three orders of magnitude at about 850° C. However, above this range, it has been found that the cermet regions formed exhibit undesirably high temperature coefficients of resistivity (TCR).

Some representative values of samples made through the method of the present invention which are useful as chip resistors for thick film hybrid circuits are shown below in Table I. The data of Table I was obtained from an aluminum oxide substrate having a cermet region therein of tungsten aluminum oxide produced in accordance with the method of the present invention. For each sample the vapor pressure of the tungsten oxide was 1.72 torr, which corresponds to a volatilization zone temperature of 1320° C. All of the samples were reacted at a reaction temperature of 1380° C. The reduction time for each sample was 8 hours. Each of the cermet regions formed through the method of the present invention was strongly adherent to its substrate, i.e., actually became part of the substrate.

Table I

Characteristics of Cermet Resistor Made Through the Method of the Present Invention

| Sheet Resistance ohm/square | TCR ppm/°C | Reaction Time(min) | Reduction Temperature (°C) |
| --- | --- | --- | --- |
| $1.4 \times 10^3$ | −100 | 50 | 600 |
| $3.0 \times 10^3$ | −100 | 50 | 600 |
| $2.0 \times 10^4$ | −100 | 30 | 600 |
| $2.7 \times 10^4$ | −100 | 30 | 600 |
| $2.2 \times 10^5$ | −500 | 5 | 600 |

Although the parameters necessary for a particular cermet resistor must be empirically determined; once determined, the results are reproducible. For a particular cermet resistor, it is only necessary to make several test samples, determine their characteristics, then interpolate and vary one (or more) of the parameters.

Resistors can be prepared from the cermet regions which are made through the method of the present invention. Such resistors have low temperature coefficients of resistivity and high sheet resistance thereby allowing for a very small sized resistor. The high sheet resistivity is obtained directly in the as-prepared layers without mechanical or chemical trimming. These resistors exhibit good thermal stability, e.g., cermet regions made through the method of the present invention can be heated to 150° C in air and still return to their original room temperature values.

Although the method of the present invention has been described with reactants of tungsten oxide and aluminum oxide, the method is equally successful when an equivalent metal oxide, e.g., a metal oxide capable of being reduced to the metal, such as molybdenum oxide, is utilized in place of the tungsten oxide. Furthermore, any equivalent material, such as mullite, $2Al_2O_3 \cdot 3SiO_2$, can be utilized in place of the aluminum oxide.

In addition, although the method of the present invention has been described with the use of a reaction chamber for volatilizing and reacting a metal oxide and a ceramic substrate, the reaction chamber described is merely one of the many conventional means which can be utilized to carry out the method of the present invention. Thus, there is provided by the method of the present invention a method wherein cermet resistors having low temperature coefficients of resistance, high sheet resistance and good thermal stability can be prepared.

We claim:

1. A method of forming a cermet region in a refractory insulating substrate comprising the steps of:

reacting a metal oxide vapor with said substrate at a sufficient temperature and for a sufficient time such that said metal oxide vapor diffuses into said substrate, said metal oxide being selected from the group consisting of tungsten oxide and molybdenum oxide, and then subjecting said reacted substrate to a reducing atmosphere at a temperature between about 600° C to about 1200° C for a sufficient time so as to reduce at least some of said metal oxide which diffused into said substrate without reducing said substrate.

2. A method in accordance with claim 1 in which said metal oxide vapor is reacted with said substrate at temperatures of from about 1300° C to about 1400° C.

3. A method in accordance with claim 2 in which said metal oxide vapor is reacted with said substrate at a temperature of about 1380° C.

4. A method in accordance with claim 2 in which said reacted substrate is exposed to a reducing atmosphere which includes hydrogen gas.

5. A method in accordance with claim 4 in which said substrate is rotated while being reacted with said metal oxide vapor such that said substrate is substantially uniformly exposed to said metal oxide vapor.

6. A method in accordance with claim 2 in which said metal oxide comprises tungsten oxide.

7. A method in accordance with claim 2 in which said metal oxide comprises molybdenum oxide.

8. A method in accordance with claim 2 in which said substrate comprises a ceramic material.

9. A method in accordance with claim 2 in which said ceramic material comprises aluminum oxide.

10. A method in accordance with claim 1 which includes reacting said metal oxide vapor with said substrate for at least 2 minutes.

11. A method in accordance with claim 1 which includes terminating the reaction of said metal oxide vapor with said substrate before said metal oxide deposits on said substrate.

12. A method in accordance with claim 1 which includes subjecting said reacted substrate to said reducing atmosphere for about 8 hours.

* * * * *